United States Patent Office 3,142,628
Patented July 28, 1964

3,142,628
PROCESS OF REDUCING FOAM IN SUBMERGED AEROBIC FERMENTATIONS
Donald Howard Phillips, North Syracuse, N.Y., assignor to Bristol-Myers Company, New York, N.Y., a corporation of Delaware
No Drawing. Filed Apr. 16, 1962, Ser. No. 187,961
14 Claims. (Cl. 195—80)

This invention relates to a new process for conducting a submerged aerobic fermentation, as to produce an antibiotic, and more particularly relates to the addition of a water-soluble condensation product, having an average molecular weight in the range of 1600 to 2800 of ethylene oxide with a condensation product of propylene oxide with propylene glycol in order to reduce surface foam without at the same time decreasing the amount of dissolved oxygen or the oxygen transfer rate.

In conducting a submerged aerobic fermentation, large amounts of surface foam are frequently produced spontaneously. At best this means that the fermentation vessel can be only partially filled with medium, which increases unit cost, and at the worst part of the medium and product therein is lost when it foams out of the vessel during the fermentation. The suppression of surface foam is therefore highly desirable and has been widely practiced. In antibiotic fermentations, the usual method has been the periodic addition of an antifoam agent during the fermentation. For reasons of low cost and low toxicity toward the microorganism being cultivated, use has been made of octadecanol dissolved in lard oil as the preferred antifoaming agent. In some instances the lard oil also serves as a metabolite, e.g., to some extent in tetracycline fermentations. This use of lard oil has created other problems, however. It is not very efficient and therefore large amounts must be used with a consequent heavy increase in expense. Furthermore, the addition of lard oil markedly decreases dissolved oxygen and therefore decreases the oxygen absorption coefficient and thus decreases aeration efficiency. Partial oxygen starvation of the microorganism may then result and cause a decrease in yield of the desired metabolite, e.g., the antibiotic being produced.

It was therefore the object of this invention to overcome these problems by providing a process which would reduce surface foam markedly without significantly decreasing dissolved oxygen.

The object of the present invention has been achieved by the provision, according to the present invention, of, in the process of producing chemicals by the method of submerged, aerated fermentation of a microorganism, the step of abating and reducing foam therein without simultaneously decreasing significantly the amount of dissolved oxygen in the fermentation broth which comprises adding as defoaming agent a water-soluble condensation product, having a total molecular weight in the range of about 1600 to about 2800 of ethylene oxide with a water-insoluble, hydrophobic polyoxypropylene chain formed by condensing propylene oxide with propylene glycol, said hydrophobic chain having a molecular weight in the range of about 1500 to about 2500 and constituting about ninety percent by weight of said water-soluble condensation product.

As two specific and preferred embodiments of the present invention there are provided according to the present invention, in the process of producing 6-aminopenicillanic acid, benzylpenicillin, phenoxymethylpenicillin or a tetracycline antibiotic by the method of submerged, aerated fermentation of a microorganism, the step of abating and reducing foam therein without simultaneously decreasing significantly the amount of dissolved oxygen in the fermentation broth which comprises adding as defoaming agent, in a weight equal to about 0.01% to 0.20%, and preferably about 0.05%, of the weight of the medium, a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product, and the step of abating and reducing foam therein without simultaneously decreasing significantly the amount of dissolved oxygen in the fermentation broth which comprises adding as defoaming agent, in a weight equal to about 0.01% to 0.20%, and preferably about 0.05%, of the weight of the medium, a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

Examples of the defoaming agents of the present invention are commercially available from Wyandotte Chemicals Corporation, Wyandotte, Michigan, under the registered trademark Pluronic, e.g., Pluronic L61 or Pluronic L81. Other members of the Pluronic series having molecular weights or compositions outside the ranges defined above are not included within the scope of the present invention as their use does not accomplish its objectives.

For ease of operation, the defoaming agent of the present invention is preferably added to the fermentation medium before sterilization or after sterilization but before inoculation although it can if desired be added during the course of the fermentation. It may be added in one or many portions. It does not actually need to be added until severe foaming begins, which may in rare cases be late in the fermentation cycle, but usually occurs early in the fermentation cycle, e.g., at the tenth to thirtieth hours. Where lard oil is added at or near the beginning of a fermentation as a nutrient, e.g., in a tetracycline fermentation, it may not be necessary to add the defoaming agent of the present invention until half-way through the fermentation cycle.

As a purely practical matter, the defoaming agent of the present invention is used in the smallest effective amount as determined by simple test. The preferred range is from about 0.01% to about 0.20% by weight of the weight of the medium and the preferred amount is about 0.05 or 0.10%.

The defoaming agents of the present invention eliminate the need for the use of lard oil as an antifoam as determined by an automatic (spark-plug) device in fermentations producing 6-aminopenicillanic acid, phenoxymethylpenicillin, benzylpenicillin or a tetracycline antibiotic.

However, lard oil may be an essential nutrient in a fermentation, e.g., of tetracycline; when small amounts of lard oil were added as essential nutrient to a tetracycline fermentation it was found that there was no depression of titers, i.e., that at least as much of the desired antibiotic was produced as when lard oil was the sole antifoam.

As shown in detail in the examples below, the defoaming agents of the present invention are particularly useful in the production of 6-aminopenicillanic acid by submerged aerobic fermentation of a penicillin-producing organism such as *P. chrysogenum*; of course, no chemical precursor such as phenylacetic acid of phenoxyacetic acid is added. In this process there is much foaming to be controlled and the amounts of octadecanol in lard oil required when that defoaming agent is used are not only large, but also severely depress the amount of dissolved oxygen and consequently reduce the yield of the desired product. On the contrary, the use in such a fermentation of a defoaming agent of the present invention completely suppresses all but an insignificant amount of surface foam without decreasing the amount of dissolved oxygen and without reducing the yield of the desired product.

The term "a tetracycline antibiotic" as used herein refers to the well-known series of antibiotics produced by fermentation of *S. aureofaciens, S. rimosus* or equivalent species; this series includes tetracycline, 7-chlorotetracycline, 5-oxytetracycline, 7-bromotetracycline, 6-demethyltetracycline, 7 - chloro-6-demethyltetracycline, 5a(11a) - dehydrotetracycline, 7-chloro-5a(11a) - dehydrotetracycline.

The following examples are given to illustrate the present invention without limiting it thereto.

*Example 1*

Two submerged aerobic fermentations of 6-aminopenicillanic acid were conducted using *P. chrysogenum* in a medium comprising 7.5% lactose, 4.0% cottonseed endosperm flour (Pharmamedia), 0.5%

$CaSO_4 \cdot 2H_2O$ 0.4% $Na_2SO_4$ and 1.5% $CaCO_3$. In both cases the fermentation was arranged in the usual manner with a spark-plug to deliver a mixture of octadecanol in lard oil as a defoaming agent whenever the surface foam reached an undesirable height.

One fermentation served as a control and in the other there was added to the medium after sterilization but before inoculation a weight equal to 0.05% of the weight of the medium of a water-soluble condensation product, having a total molecular weight of about 1900–2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product, i.e., Pluronic L61.

The run using the defoaming agent of the present invention showed a peak titer of 3480 mcg./ml. 6-aminopenicillanic acid (at 120 hours) and consumed no lard oil defoamer at all during the fermentation. The control showed a lower peak titer of 2920 mcg./ml. 6-aminopenicillanic acid (at 140 hours) and up to the time of reaching peak titer consumed much lard oil, i.e., a weight equal to 0.90% of the weight of the medium.

*Example 2*

A fermentation was conducted in the manner described in Example 1, except that the amount of $CaCO_3$ in the medium was increased from 1.5% to 1.75% and the amount of defoaming agent (Pluronic L61) was increased to 0.10%. The run showed a peak titer at 140 hours of 3280 mcg./ml. 6-aminopenicillanic acid and consumed no octadecanol-lard oil at all.

*Example 3*

A fermentation was conducted in the manner described in Example 2 except that as defoaming agent there was used a weight equal to 0.05% of the weight of the medium of a water-soluble condensation product, having a molecular weight of about 2500–2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product, i.e., Pluronic L81. The run showed a peak titer at 140 hours of 3760 mcg./ml. 6-aminopenicillanic acid and consumed no lard oil defoaming agent at all.

I claim:

1. In the process of producing an antibiotic by the method of submerged, aerated fermentation of a microorganism, the step of abating and reducing foam therein without simultaneously decreasing significantly the amount of dissolved oxygen in the fermentation broth which comprises adding as defoaming agent a water-soluble condensation product, having a total molecular weight in the range of about 1600 to about 2800, of ethylene oxide with a water-insoluble, hydrophobic polyoxyproplyene chain formed by condensing propylene oxide with propylene glycol, said hydrophobic chain having a molecular weight in the range of about 1500 to about 2500 and constituting about ninety percent by weight of said water-soluble condensation product.

2. In the process of producing an antibiotic by the method of submerged, aerated fermentation of a microorganism, the step of abating and reducing foam therein without simultaneously decreasing significantly the amount of dissolved oxygen in the fermentation broth which comprises adding as defoaming agent in a weight equal to at least 0.01% of the weight of the medium, a water-soluble condensation product, having a total molecular weight in the range of about 1600 to about 2800, of ethylene oxide with a water-insoluble, hydrophobic polyoxypropylene chain formed by condensing propylene oxide with propylene glycol, said hydrophobic chain having a molecular weight in the range of about 1500 to about 2500 and constituting about ninety percent by weight of said water-soluble condensation product.

3. In the process of producing an antibiotic by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 1600 to about 2800, of ethylene oxide with a water-insoluble, hydrophobic polyoxypropylene chain formed by condensing propylene oxide with propylene glycol, said hydrophobic chain having a molecular weight in the range of about 1500 to about 2500 and constituting about ninety percent by weight of said water-soluble condensation product.

4. In the process of producing an antibiotic by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.05% of the weight of the medium a water-soluble condensation product, having a total molecular weight in the range of about 1600 to about 2800, of ethylene oxide with a water-insoluble, hydrophobic polyoxypropylene chain formed by condensing propylene oxide with propylene glycol, said hydrophobic chain having a molecular weight in the range of about 1500 to about 2500 and constituting about ninety percent by weight of said water-soluble condensation product.

5. In the process of producing 6-aminopenicillanic acid by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product.

6. In the process of producing 6-aminopenicillanic acid by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

7. In the process of producing benzylpenicillin by the method of submerged, aerated fermentation of a microorganism the step of abating and reducing foam therein without simultaneously decreasing significantly the amount of dissolved oxygen in the fermentation broth which comprises adding as defoaming agent in a weight equal to about 0.01% to 0.20% the weight of the medium a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product.

8. In the process of producing benzylpenicillin by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

9. In the process of producing phenoxymethylpenicillin by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product.

10. In the process of producing phenoxymethylpenicillin by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

11. In the process of producing a tetracycline antibiotic by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product.

12. In the process of producing a tetracycline antibiotic by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

13. In the process of producing tetracycline by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 1900 to about 2000, of ethylene oxide with a water-insoluble, hydrophobic polyoxypropylene chain formed by condensing propylene oxide with propylene glycol, said hydrophobic chain having a molecular weight of about 1750 and constituting about ninety percent by weight of said water-soluble condensation product.

14. In the process of producing tetracycline by the method of submerged, aerated fermentation of a microorganism, the step of abating and reducing foam therein without simultaneously decreasing significantly the amount of dissolved oxygen in the fermentation broth which comprises adding as defoaming agent in a weight equal to about 0.01% to 0.20% of the weight of the medium a water-soluble condensation product, having a total molecular weight in the range of about 2500 to about 2700, of ethylene oxide with a water-insoluble, hydrophobic polyoxypropylene chain formed by condensing propylene oxide with propylene glycol, said hydrophobic chain having a molecular weight of about 2250 and constituting about ninety percent by weight of said water-soluble condensation product.

References Cited in the file of this patent

UNITED STATES PATENTS 2,666,017    Moss et al. _____ Jan. 12, 1954